3,090,818
CHLOROFLUOROALKANE COMPOSITIONS
Laurence J. Long, Wilmington, Del., assignor to E. I. du Pont de Nemours and Company, Wilmington, Del., a corporation of Delaware
No Drawing. Filed May 11, 1960, Ser. No. 28,223
9 Claims. (Cl. 260—652.5)

This invention relates to chlorofluoroalkane compositions and particularly to certain chlorofluoroalkanes containing minor proportions of compounds which inhibit reaction of the chlorofluoroalkanes with primary and secondary alcohols.

Although it has been known for several years that perfluorinated olefins are sensitive to attack by oxygen, saturated fluorine-containing perhalogenated hydrocarbons are considered to be stable under ordinary conditions and, indeed, oxidation and hydrolysis, which cause the decomposition of other halogenated hydrocarbons, have no effect on the fluorine-containing compounds. Recently, it was reported that certain fluorine-containing perhaloalkanes, including trichlorofluoromethane, react fairly rapidly with alkanols in the presence of silver ions to give hydrogen halide, an aldehyde or ketone (depending on whether a primary or secondary alcohol is involved) and a halogenated organic compound wherein one chlorine or bromine has been replaced by hydrogen [Heberling, Jr., et al. J.A.C.S., 78 5433 (1956)]. The silver ion naturally reacts with the hydrogen halide to precipitate silver halide. Silver ion was shown to catalyze the reaction but not to be a necessary reactant, albeit the reaction is very much slower without silver ion. The reaction was not reported for trichlorofluoromethane in the absence of silver ions. The reaction that occurs between trichlorofluoromethane and ethyl alcohol is as follows:

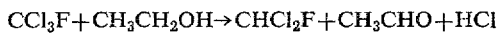

$$CCl_3F + CH_3CH_2OH \rightarrow CHCl_2F + CH_3CHO + HCl$$

This reaction does not appear to occur with more highly fluorinated chlorofluoromethanes such as dichlorodifluoromethane. The reaction occurs only in the presence of primary and secondary alcohols, tertiary alcohols being unreactive, and is briefly inhibited by hydroquinone. In the pure state, trichlorofluoromethane is quite stable.

In the past, the reaction of trichlorofluoromethane with alcohols was of little consequence since these two compounds were seldom used together. Recently, certain aerosol formulations which involve the use of trichlorofluoromethane and ethyl alcohol (e.g. aerosol "hair sprays") have become large scale commercial products and the above described reaction has become a serious problem. Not only does the product, acetaldehyde, have an objectionable odor and form colored and odoriferous condensation products, but the hydrogen chloride seriously attacks the metallic container forming insoluble metal salts and hydrogen. The formation of hydrogen leads to a rapid increase in pressure within the container which, in combination with the weakening of the container due to corrosion, often leads to bulging and rupture of the aerosol container. The other product of the reaction, dischloromonofluoromethane, also leads to a pressure increase within the container but this is not nearly so serious as that due to hydrogen. Although hydrogen chloride is formed, both in the reaction of chlorofluoroalkanes with alcohols and in the decomposition of some chlorinate dhydrocarbons, the cause of the formation of the hydrogen chloride is fundamentally different. The chlorofluoroalkanes form HCl only in the presence of alcohols and are stable on storage under conditions which cause chlorinated hydrocarbons to decompose.

The subject of inhibiting the reaction of trichlorofluoromethane with an alcohol must be considered from the viewpoint of the end use. The trichlorofluoromethane is used as the propellent, usually as one member of a propellent mixture, and the alcohol usually is used as the solvent for a solid or liquid material which is to be dispensed via an aerosol system. The inhibitor used must, therefore, not be objectionable in the end use intended. Most of these aerosols come in contact with human beings and the inhibitor must be harmless to humans. The products of the reaction, being colored, odoriferous and acidic, are objectionable and harmful to humans and therefore their formation must be prevented. The ever-present possibility of violent rupture of the aerosol container due to hydrogen pressure is also dangerous to humans and must be prevented. There is thus good cause not only to find inhibitors for the reaction but also to find inhibitors which are harmless to humans.

It is known now that the reaction between alcohols and trichlorofluoromethane takes place most rapidly when air is essentially absent. Since air itself inhibits the reaction, almost any compound will inhibit the reaction if sufficient air is present but only certain compounds will inhibit the reaction if air is essentially absent. While it may seem feasible to inhibit the reaction by merely leaving air in the aerosol container, this procedure is not tenable from a practical viewpoint. It does not appear to be possible to leave a controlled amount of air in such a system. Uncontrolled amounts of air are dangerous due to the rather limited pressure service range of aerosol containers and the possibility that the uncontrolled amount of air may cause the pressure to exceed the strength of the container (cf. the result from too much hydrogen). Air also has a deleterious effect on the components of many aerosol formulations, e.g. perfumes.

Trichlorotrifluoroethanes and tetrachlorodifluoroethanes are frequently employed in admixture with primary and secondary alcohols as solvent media for cleaning, e.g. degreasing, dewaxing, and the like, of electronic equipment, compressors, photographic film, lithographic plates, typewriters, sensitive instruments, gauges, and the like, and for removing varnish, rosin, and like coatings from printed electrical circuits. In such cases, the formation of hydrogen chloride and of colored and odoriferous condensation products are objectionable and harmful to humans and to the equipment being cleaned. Therefore, it is important to inhibit the reaction to these chlorofluoroalkanes with alcohols.

It is an object of this invention to provide means to inhibit the reaction between primary and secondary alcohols and trichlorofluoromethane, trichlorotrifluoroethanes and tetrachlorodifluoroethanes. A particular object is to provide inhibitors for such purposes which are volatile, non-acidic, relatively non-toxic, relatively inexpensive, and which are effective in small concentrations and for reasonably long periods of time. Other objects are to provide new compositions of matter and to advance the art. Still other objects will appear hereinafter.

The above and other objects may be accomplished in accord with this invention which comprises a composition resistant to reaction with primary and secondary alkanols which consists essentially of a chlorofluoroalkane of the group consisting of trichlorofluoromethane, trichlorotrifluoroethanes and tetrachlorodifluoroethanes and from about 0.1% to about 5% by weight of an olefinic compound of the group consisting of propylene, isobutylene, 1-butene, butadiene, isoprene, vinyl chloride, vinyl fluoride, and methyl methacrylate.

It has been found that, if the aforesaid olefinic compounds are present when the aforesaid chlorofluoroalkanes are brought into contact with primary and secondary alkanols, the reaction normally occurring between the chlorofluoroalkane and the alkanol is effectively inhibited for periods of at least 6 months under ordinary storage conditions. Said olefinic compounds are volatile, non-acidic, substantially non-toxic, low in cost and are highly effective in small concentrations. They do not have objectionable odor or color and are not corrosive to metals and do not attack most materials with which the compositions of this invention will ordinarly be brought into contact. The mechanism by which these compounds inhibit the reaction between the chlorofluoroalkanes and the alkanols is not known with certainty and could not be predicted.

The inhibiting effect appears to be specific to the aforesaid olefinic compounds. Closely related olefinic compounds, such as pentene-1 and longer chain olefins, internal olefins such as 2-butene and 2-pentene, vinyl acetate, vinylidene chloride, N-vinyl pyrrolidone, Terpene B (a mixture containing predominantly β-pinene), methyl vinyl ketone, glycidal methacrylate and acetylenic compounds, are ineffective or substantially so for the purposes of this invention; whereby the effectiveness of the compounds of this invention is surprising. Also, hydroquinone and like phenolic compounds, free radical inhibitors, and, in general, compounds known to be useful for inhibiting the decomposition of chlorinated hydrocarbons, are not useful for the purposes of this invention because of little or no effectiveness to inhibit the reaction, low volatility, cost, objectionable odor or color, toxicity, acidity, and like defects.

The alkanols involved usually are the primary and secondary alkanols which are normally liquid, i.e. at normal temperatures and pressures. Most usually, the alkanols are the lower alkanols, i.e. containing 1-4 carbon atoms, such as methanol, ethanol, propanol, isopropanol, n-butanol, isobutanol, and secondary butanol.

The chlorofluoroalkanes to be used or treated in accord with this invention are trichlorofluoromethane, 1,1,2-trichloro-1,2,2-trifluoroethane, 1,1,1-trichloro-2,2,2-trifluoroethane, tetrachloro-1,2-difluoroethane, and tetrachloro-2,2-difluoroethane. The invention is most preferably applied to trichlorofluoromethane.

The inhibiting compounds are propylene, isobutylene, 1-butene, butadiene, isoprene, vinyl chloride, vinyl fluoride, and methyl methacrylate, and mixtures of any two or more thereof. The preferred inhibitors at the specified concentration range are propylene, isobutylene, vinyl chloride, vinyl fluoride, isoprene, butadiene and methyl methacrylate.

The olefinic inhibitor compound will be employed in a proportion of from about 0.1% to about 5% by weight based on the chlorofluoroalkane. Materially smaller proportions are less effective and for shorter periods of time. Larger proportions of the inhibitors may be employed but are unnecessary for most purposes and tend to be uneconomical.

The olefinic compounds of this invention are very soluble in both the chlorofluoroalkanes and the alkanols. Also, the chlorofluoroalkanes and the alkanols are very soluble in each other. The inhibitor can be added to the chlorofluoroalkane, or to the alkanol, or to compositions containing either or both the chlorofluoroalkane and the alkanol. The alkanol may be mixed with another solvent or it may be a component (e.g. a solvent) of a material to be dispensed as an aerosol. The trichlorofluoromethane may, and usually will be a member of a mixture of propellents, the other members of which are lower boiling (higher pressure) chlorofluoroalkanes, such as dichlorodifluoromethane, dichlorotetrafluoroethane, monochlorodifluoromethane, 1,1-difluoroethane and octafluorocyclobutane. Sometimes, normally gaseous alkanes, such as propane, butane and isobutane are included in minor proportions in such propellent mixtures. A representative propellant mixtures consists of 45% by weight of trichlorofluoromethane, 45% by weight of dichlorodifluoromethane and 10% by weight of isobutane. It is preferred to add the inhibitor to the chlorofluoroalkane or to a propellent mixture containing it, so that it will be present when the chlorofluoroalkane comes into contact with or is admixed with a primary or secondary alkanol or with compositions containing such alkanols.

In order to more clearly illustrate this invention and the advantageous results to be obtained thereby examples are given hereinafter in Table I (including duplicate experiments in certain cases); together with, in Table II for purposes of comparison, examples of other compounds which are closely related or which have been disclosed in the prior art to be useful for inhibiting the decomposition of chlorinated hydrocarbons.

In evaluating the various compounds as inhibitors, the test of storing the composition for 6 months at 100° F. was employed. This test is standard in the aerosol industry for evaluating the effects on aerosol cans of various materials which might be used therein. The inhibitors were evaluated on the basis of three criteria, the odor of the solution, the color of the solution, and corrosion of the metallic aerosol container, after storage for 6 months at 100° F.

In more detail, the testing and evaluation of the compounds as inhibitors was carried out as follows:

The compound was dissolved at the desired concentration in specification 39-C denatured alcohol (39-C alcohol contains 1 gallon of diethyl phthalate per 100 gallons of 200 proof ethyl alcohol). Trichlorofluoromethane (120% of the required amount) was added and then 150 g. of the mixture was placed in a tin-plated steel aerosol container and the excess trichlorofluoromethane allowed to boil off to expel air until the mixture contained 70% by weight trichlorofluoromethane, the remaining 30% being the alcohol solution containing the prospective inhibitor in the desired concentration. The aerosol container was then capped and allowed to stand in a constant temperature room at 100° F. for six months. At the end of six months, the can and contents were examined; the color visually, the odor by comparison with a duplicate of the original mixture, and the "pH" by use of a Beckman pH meter using the calomel and glass electrodes. The "pH" values determined should only be compared among themselves, the values are not directly correlatable with hydrogen ion concentration because the readings are taken in an alochol solution. Corrosion of the cans was evaluated as follows: no visual change—no corrosion; discoloration or very slight etching—slight corrosion; visual, mild attack on metal, no salt deposits—moderate corrosion; heavy attack on metal accompanied, usually, by salt deposits, bulging and/or perforation of the can—severe corrosion. A prospective inhibitor was considered satisfactory if no color or odor was produced, if insufficient corrosion took place to weaken the aerosol container, and if insufficient hydrogen was formed to cause dangerously high pressures (i.e. moderate corrosion or less).

Table I

| No. | Inhibitor | Weight percent of inhibitor in CCl₃F | Results of storage at 100° F. for 6 months | | | |
|---|---|---|---|---|---|---|
| | | | pH | Odor | Color | Corrosion |
| I | Propylene | 2.0 | 3.7 | No change | None | Slight. |
| | | 1.0 | 3.3 | do | do | Do. |
| | | 0.5 | 2.5 | do | do | None. |
| | | 0.1 | 2.0 | Pungent | Light brown | Moderate |
| | | 0.01 | 1.9 | do | do | Do. |
| | | 0.001 | 1.9 | do | Brown | Do. |
| II | do | 1.0 | 4.3 | No change | None | Slight. |
| | | 0.5 | 4.5 | do | do | None. |
| | | 0.1 | 3.7 | Pungent | Yellow | Moderate |
| | | 0.01 | 4.1 | do | Dark yellow | Do. |
| | | 0.001 | 4.1 | do | do | Do. |
| III | Vinyl chloride | 1.0 | 2.3 | No change | None | Slight. |
| | | 0.5 | 2.7 | do | do | Do. |
| | | 0.1 | 2.1 | Slight | Light yellow | Moderate. |
| | | 0.01 | 3.4 | Pungent | Brown | Do. |
| | | 0.001 | 3.1 | do | Dark brown | Do. |
| IV | Isobutylene | 1.0 | 2.4 | No change | None | Slight. |
| | | 0.5 | 2.0 | do | do | Do. |
| | | 0.1 | 1.8 | Slight | Dark brown | Moderate. |
| | | 0.01 | 2.7 | do | Yellow | Do. |
| | | 0.001 | 2.7 | Pungent | Dark yellow | Do. |
| V | Isoprene | 1.0 | 2.9 | No change | Cloudy-gray | None. |
| | | 0.5 | 2.9 | do | None | Slight |
| | | 0.1 | 3.3 | do | do | None. |
| | | 0.01 | 1.8 | Pungent | Yellow | Moderate. |
| | | 0.001 | 1.9 | do | Black-green | Severe. |
| VI | Butadiene | 1.0 | 5.0 | No change | None | Slight. |
| | | 0.5 | 5.3 | do | do | Do. |
| | | 0.1 | 6.2 | do | do | Do. |
| | | 0.01 | 5.5 | Pungent | Light yellow | Moderate. |
| | | 0.001 | 5.2 | do | Dark brown | Severe. |
| VII | Methyl methacrylate | 1.0 | 2.0 | No change | None | Slight. |
| | | 0.5 | 4.1 | do | do | Do. |
| | | 0.1 | 3.3 | do | Yellow | Moderate. |
| | | 0.01 | 3.5 | Pungent | Dark brown | Severe. |
| | | 0.001 | 3.2 | do | do | Do. |
| VIII | Control | 0 | (¹) | (¹) | (¹) | (¹). |

¹ Containers bulged and leaked before end of test period.

Table II

| No. | Inhibitor | Weight percent of inhibitor in CCl₃F | Results of storage at 100° F. for 6 months | | | |
|---|---|---|---|---|---|---|
| | | | pH | Odor | Color | Corrosion |
| I | Diisobutylene | 1.0 | 1.2 | Pungent | Brown | Moderate. |
| | | 0.5 | 1.5 | do | do | Do. |
| | | 0.1 | 1.4 | do | do | Severe. |
| | | 0.01 | 1.5 | do | do | Do. |
| | | 0.001 | 1.3 | do | do | Do. |
| II | t-Butanol | 2.0 | (¹) | (¹) | (¹) | (¹). |
| | | 1.0 | (¹) | (¹) | (¹) | (¹). |
| | | 0.5 | (¹) | (¹) | (¹) | (¹). |
| | | 0.1 | (¹) | (¹) | (¹) | (¹). |
| | | 0.01 | (¹) | (¹) | (¹) | (¹). |
| | | 0.001 | (¹) | (¹) | (¹) | (¹). |
| III | Hydroquinone | 0.5 | (¹) | (¹) | (¹) | (¹). |
| | | 0.1 | (¹) | (¹) | (¹) | (¹). |
| IV | Nickel sulfate | (²) | (¹) | (¹) | (¹) | (¹). |
| V | CH₃CH₂CH—CH₂OH<br>        |<br>       NO₂ | 1.0 | 5.2 | Pungent | Brown | Moderate. |
| | | 0.5 | 5.1 | do | do | Do. |
| | | 0.1 | 4.2 | do | do | Severe. |
| | | 0.01 | (¹) | (¹) | (¹) | (¹). |
| | | 0.001 | 4.3 | do | Brown | Severe. |
| VI | Glycidal methacrylate | 2.0 | 1.8 | do | Trace | Moderate. |
| | $CH_2\text{—}CH\text{—}CH_2\text{—}O\text{—}\overset{O}{\overset{\|}{C}}\text{—}\underset{CH_3}{C}=CH_2$<br>    $\underset{O}{\diagdown\diagup}$ | 1.0 | 3.5 | do | do | Do. |
| | | 0.5 | 2.4 | do | do | Do. |
| | | 0.1 | 1.5 | do | Brown | Do. |
| | | 0.01 | 0.7 | do | do | Severe. |
| | | 0.001 | 1.2 | do | do | Do. |
| VII | Terpene B | 2.0 | (¹) | (¹) | (¹) | (¹). |
| | | 1.0 | (¹) | (¹) | (¹) | (¹). |
| | | 0.5 | (¹) | (¹) | (¹) | (¹). |
| | | 0.1 | (¹) | (¹) | (¹) | (¹). |
| | | 0.01 | (¹) | (¹) | (¹) | (¹). |
| | | 0.001 | (¹) | (¹) | (¹) | (¹). |
| VIII | N-vinyl pyrrolidone | 1.0 | (¹) | (¹) | (¹) | (¹). |
| | | 0.5 | (¹) | (¹) | (¹) | (¹). |
| | | 0.1 | (¹) | (¹) | (¹) | (¹). |
| | | 0.01 | (¹) | (¹) | (¹) | (¹). |
| | | 0.001 | (¹) | (¹) | (¹) | (¹). |

See footnotes at end of table.

| No. | Inhibitor | Weight percent of inhibitor in CCl₃F | Results of storage at 100° F. for 6 months ||||
|---|---|---|---|---|---|---|
| | | | pH | Odor | Color | Corrosion |
| IX | Vinyl acetate | 1.0 | 3.9 | Pungent | Brown | Slight. |
| | | 0.5 | 2.6 | do | do | Severe. |
| | | 0.1 | 2.6 | do | do | Do. |
| | | 0.01 | 4.4 | do | do | Do. |
| | | 0.001 | 3.3 | do | do | Do. |
| X | Vinylidene chloride | 2.0 | 4.0 | No change | None | Slight. |
| | | 1.0 | 4.1 | Pungent | Yellow | Moderate. |
| | | 0.5 | 5.3 | do | do | Do. |
| | | 0.1 | 5.3 | do | Brown | Severe. |
| | | 0.01 | (¹) | (¹) | (¹) | (¹). |
| | | 0.001 | (¹) | (¹) | (¹) | (¹). |
| XI | Benzothiazol | 2.0 | 2.2 | Pungent | Yellow | Slight. |
| | | 1.0 | 2.3 | do | do | Do. |
| | (²) | 0.5 | | | | |
| | | 0.1 | 1.8 | Pungent | Yellow | Moderate. |
| | | 0.01 | 2.0 | do | Brown | Do. |
| | | 0.001 | 1.5 | do | do | Severe. |
| XII | Propargyl alcohol | 0.5 | (¹) | (¹) | (¹) | (¹). |
| | CH≡CCH₂OH | | | | | |
| XIII | Pentene-1 | 0.5 | (¹) | (¹) | (¹) | (¹). |
| XIV | Pentene-2 | 0.5 | (¹) | (¹) | (¹) | (¹). |
| XV | 3-methyl-3-hydroxy-1-butyne | 2.0 | (¹) | (¹) | (¹) | (¹). |
| | | 1.0 | (¹) | (¹) | (¹) | (¹). |
| | (CH₃)₂C(OH)C≡CH | | | | | |
| XVI | Methyl vinyl ketone | 2.0 | (¹) | (¹) | (¹) | (¹). |
| | | 1.0 | (¹) | (¹) | (¹) | (¹). |
| XVII | 1,2-butylene oxide | 2.0 | (¹) | (¹) | (¹) | (¹). |
| | | 1.0 | (¹) | (¹) | (¹) | (¹). |
| | | 0.5 | (¹) | (¹) | (¹) | (¹). |
| | | 0.1 | (¹) | (¹) | (¹) | (¹). |
| | | 0.01 | (¹) | (¹) | (¹) | (¹). |
| | | 0.001 | (¹) | (¹) | (¹) | (¹). |

¹ Cans bulged and leaked before end of test period.
² Saturation solution in alcohol.
³ Cans leaked and bulged at end of 7 months.

It will be apparent from Table I that the compounds of this invention are satisfactory inhibitors of the reaction between the chlorofluoroalkane and the alcohol for at least 6 months when employed in concentrations of about 0.1% by weight or higher. At concentrations below 0.1%, these compounds will inhibit the reaction for shorter periods of time, but not for the 6 months period at 100° F. which is usually desired.

Table II shows that two of the compounds therein are poor inhibitors, e.g. vinyl acetate at 1% or higher and vinylidene chloride at 2% or higher, while the remaining compounds are not inhibitors at any useful concentration.

It will be understood that the preceding examples have been given for illustrative purposes solely and that this invention is not limited to the specific embodiments described therein. On the other hand, it will be apparent to those skilled in the art that, subject to the limitations set forth in the general description, the materials and proportions may be considerably varied without departing from the spirit or scope of this invention.

From the preceding description, it will be apparent that this invention provides novel compositions of certain chlorofluoroalkanes and certain olefinic compounds which are resistant to the reaction which normally occurs between said chlorofluoroalkanes and primary and secondary alcohols. Therefore, there is provided a means whereby said chlorofluoroalkanes can be employed in conjunction with primary and secondary alcohols and maintained in contact or admixture therewith for long periods of time without the aforesaid undesirable reactions taking place. Accordingly, it will be apparent that this invention constitutes a valuable advance in and contribution to the art.

The embodiments of the invention in which an exclusive property or privilege is claimed are defined as follows:

1. A composition resistant to reaction with primary and secondary alkanols which consists essentially of a chlorofluoroalkane of the group consisting of trichlorofluoromethane, trichlorotrifluorethanes and tetrachlorodifluoroethanes and from about 0.1% to about 5% by weight of an olefinic compound of the group consisting of propylene, isobutylene, 1-butene, butadiene, isoprene, vinyl chloride, vinyl fluoride, and methyl methacrylate.

2. A composition resistant to reaction with primary and secondary alkanols which consists essentially of trichlorofluoromethane and from about 0.1% to about 5% by weight of an olefinic compound of the group consisting of propylene, isobutylene, 1-butene, butadiene, isoprene, vinyl chloride, vinyl fluoride, and methyl methacrylate.

3. A composition resistant to reaction with primary and secondary alkanols which consists essentially of trichlorofluoromethane and from about 0.1% to about 5% by weight of propylene.

4. A composition resistant to reaction with primary and secondary alkanols which consists essentially of trichlorofluoromethane and from about 0.1% to about 5% by weight of isobutylene.

5. A composition resistant to reaction with primary and secondary alkanols which consists essentially of trichlorofluoromethane and from about 0.1% to about 5% by weight of butadiene.

6. A composition resistant to reaction with primary and secondary alkanols which consists essentially of trichlorofluoromethane and from about 0.1% to about 5% by weight of isoprene.

7. A composition resistant to reaction with primary and secondary alkanols which consists essentially of trichlorofluoromethane and from about 0.1% to about 5% by weight of vinyl chloride.

8. A composition resistant to reaction with primary and secondary alkanols which consists essentially of trichlorofluoromethane and from about 0.1% to about 5% by weight of vinyl fluoride.

9. A composition resistant to reaction with primary and secondary alkanols which consists essentially of trichlorofluoromethane and from about 0.1% to about 5% by weight of methyl methacrylate.

References Cited in the file of this patent

UNITED STATES PATENTS

| | | |
|---|---|---|
| 2,068,607 | Olin | Jan. 19, 1937 |
| 2,407,405 | Dietrich et al. | Sept. 10, 1946 |
| 2,435,312 | Klabunde | Feb. 3, 1948 |

UNITED STATES PATENT OFFICE
CERTIFICATE OF CORRECTION

Patent No. 3,090,818                                      May 21, 1963

Laurence J. Long

It is hereby certified that error appears in the above numbered patent requiring correction and that the said Letters Patent should read as corrected below.

Column 1, line 62, for "dis-" read -- di- --; column 2, line 4, for "chlorinate dhydrocarbons" read -- chlorinated hydrocarbons --; column 4, line 14, for "propellant" read -- propellent --; line 15, for "mixtures" read -- mixture --; columns 7 and 8, in the table, third column, last line thereof, for "9.001" read -- 0.001 --; same table, footnote 2 thereof, for "Saturation" read -- Saturated --.

Signed and sealed this 3rd day of December 1963.

(SEAL)
Attest:

ERNEST W. SWIDER                                  EDWIN L. REYNOLDS

Attesting Officer                                Acting Commissioner of Patents